United States Patent [19]

Price et al.

[11] 4,134,577
[45] Jan. 16, 1979

[54] FLY-TYING VISE

[76] Inventors: Alexander Price, Box 356; Eric A. Price, 15829 Jackpine Rd., both of LaPine, Oreg. 97739

[21] Appl. No.: 831,733

[22] Filed: Sep. 9, 1977

[51] Int. Cl.² .............................................. B25B 1/22
[52] U.S. Cl. ..................................... 269/71; 269/101; 269/229
[58] Field of Search .................. 269/45, 71, 73, 76, 269/81, 95, 97–98, 101, 166, 229, 234, 254 R; 279/41 R; 81/25; 294/100

[56] References Cited

U.S. PATENT DOCUMENTS

| 669,282 | 3/1901 | Lanpher | 269/166 |
| 1,579,002 | 3/1926 | Koch | 269/81 |
| 1,811,518 | 6/1931 | Palmer | 269/101 |
| 2,586,636 | 2/1952 | Fischer et al. | 269/229 |
| 4,039,178 | 8/1977 | Odames | 269/75 |

Primary Examiner—Robert C. Watson

Attorney, Agent, or Firm—Klarquist, Sparkman, Campbell, Leigh, Hall & Whinston

[57] ABSTRACT

A fly-tying vise has a vise portion for gripping a fly-tying hook supported by a vertical support post above a clamp portion for gripping the free edge of a tabletop. A jaw assembly of the vise portion has a pair of hook-clamping jaws opened and closed by a thumb screw. The jaw assembly cooperates with a spring-biased detent to allow rotation of the jaws without changing their closure setting through application of a combined axial and torsional pressure to the thumb screw. The clamp portion includes a sleeve slidably adjustable along the support post and a pair of clamping arms, one fixed to and the other slidable along the sleeve to adjust for different tabletop thicknesses. The slidable arm carries a thumb-screw-operated bearing disc which creates a bind between the slidable arm and sleeve to hold such arm in an adjusted position when the disc and fixed arm bear against opposed surfaces of a tabletop.

10 Claims, 4 Drawing Figures

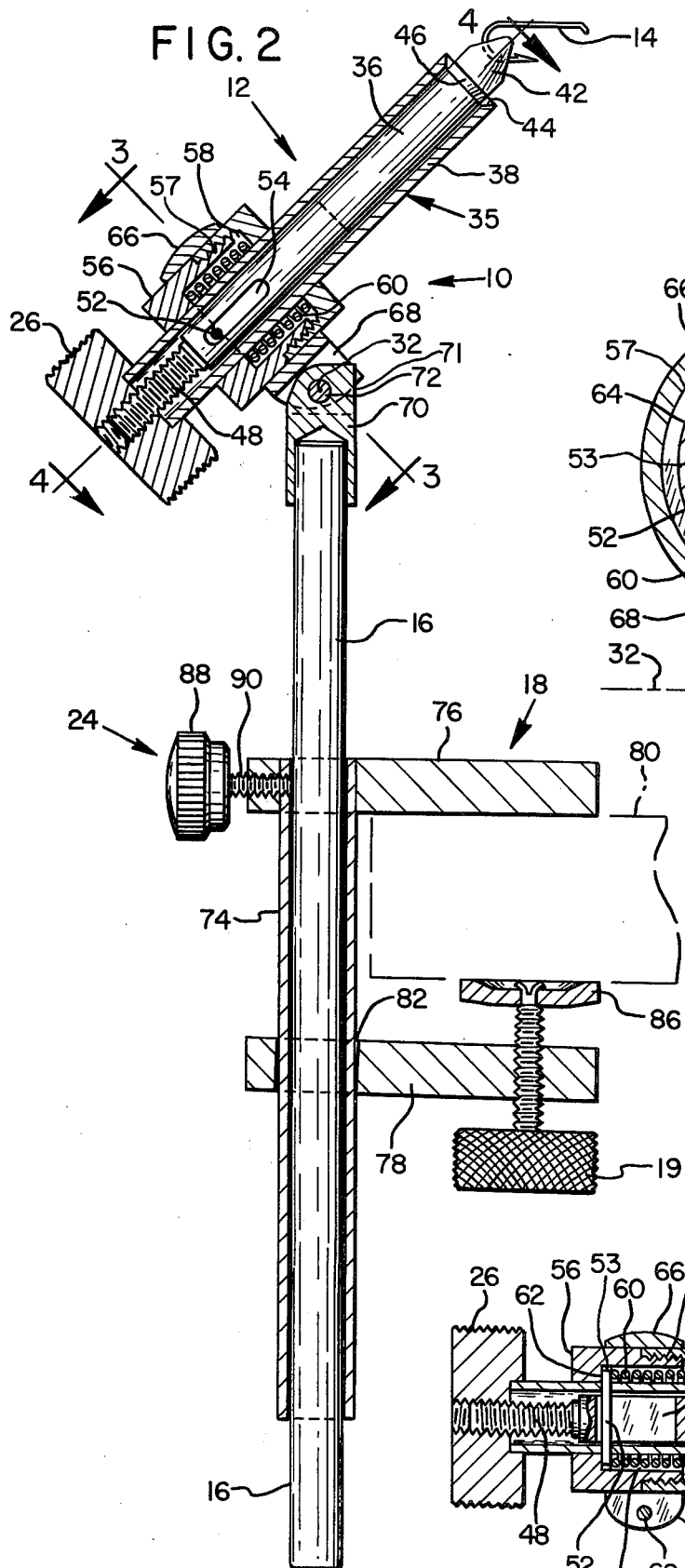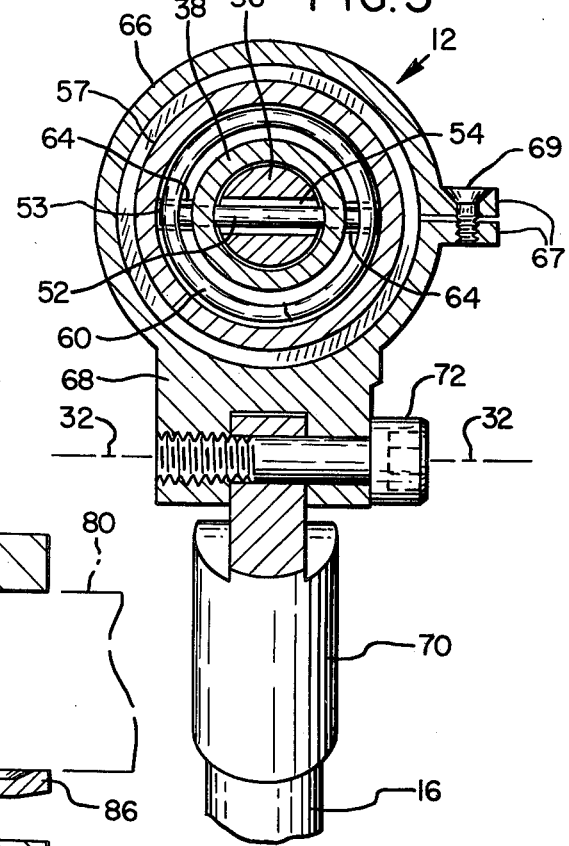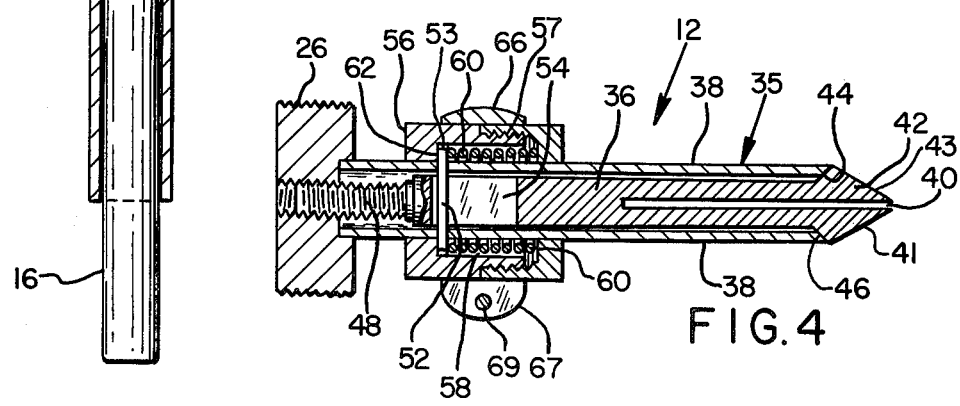

FLY-TYING VISE

BACKGROUND OF THE INVENTION

1. Field of the Invention

The present invention relates to adjustable vises of the type which may be removably clamped to the free edge of a tabletop, and especially to fly-tying vises.

2. Description of the Prior Art

In fly-tying vises it is desirable to provide a means for rotating the vise jaws about their longitudinal axis for adjusting the rotational position of the fly-tying hook or for winding thread onto the hook. In the past, vises with this feature have required two separate adjustments, one to open and close the jaws and another to rotate the jaws. This has resulted in complicated vises which are slow and cumbersome to use.

Additionally, the table-clamp portions of known fly-tying vises are not rapidly and efficiently adjustable to workbenches of widely varying thicknesses and have very limited openings of one and one-quarter inches or less, thus rendering them unsuitable for attachment to thick tabletops.

Also, most known vises do not enable the hook to be swiveled in a vertical arc about a horizontal axis.

In addition, known vises are usually incapable of holding hooks of different sizes throughout the entire range of hook sizes usually desired by the fly-tier.

In summary, prior fly-tying vises have either had too few adjustments to enable the fly-tier to do an efficient job during all phases of the fly-tying process, or necessary adjustments have been embodied in unduly complex mechanisms and have been very slow, cumbersome and difficult to make.

SUMMARY OF THE INVENTION

The fly-tying vise of the present invention embodies all of the desired adjustments in a simplified efficient design for optimum efficiency in fly tying.

One feature of the invention is a hook-clamping jaw assembly that can be rotated to position the hook in any desired rotational position using the same adjustment device as is used to open and close the hook-clamping jaws, but without changing the clamping adjustment of such jaws. This feature thus promotes efficiency of hand movements of the fly-tier and fast work. This jaw rotation feature is achieved through use of a unique spring detent mechanism which cooperates with the jaw assembly. In a preferred embodiment, a thumb screw at the rear of the jaw assembly, when rotated only, opens and closes the jaws. But when the thumb screw is both pushed axially and rotated to release the detent mechanism, the jaw assembly rotates without opening and closing the jaws.

Another feature of the invention is a simplified table clamp portion which can be quickly and easily clamped to tabletops of widely varying and exceptionally large thicknesses. The clamp embodies two clamping arms, one fixed to and the other slidable on a support. The slidable arm can be held in any desired position of adjustment with respect to the fixed arm by creating a bind between the slidable arm and its support when the two arms bear against opposite surfaces of a tabletop.

A third feature of the invention is a height and rotational adjustment of the jaw assembly portion of the vise about a vertical axis while the vise remains clamped to a tabletop. This feature is achieved in the preferred embodiment by slidably mounting a vertical support post for the jaw assembly in a vertical sleeve, and by mounting the table-clamping arms on the sleeve. With this arrangement the post can be raised, lowered and rotated while the sleeve remains clamped to the table.

Additional features include a variety of adjustments which enable (1) the hook to be swiveled in a vertical arc while held in the vise, (2) the vise jaws to grip hooks of a wide range of sizes, and (3) the jaw assembly to lock after 180° of rotation about its longitudinal axis.

A primary object is to provide such a vise with an improved and simplified table-clamping portion having a wide range of adjustability for varying tabletop thicknesses.

A further primary object is to provide a vise as aforesaid with a height and rotational adjustment which does not require release of the table clamp.

Another primary object is to provide a vise as aforesaid with a rotational adjustment of the hook-clamping jaws through manipulation of the same means that opens and closes the jaws so that the hook can be rotated easily during the fly-tying process.

Still another important object is to provide a vise as aforesaid in which the jaws can be rotated without opening or closing them.

The foregoing and other objects, features and advantages of the invention will become more apparent from the following detailed description, which proceeds with reference to the accompanying drawings.

BRIEF DESCRIPTION OF THE DRAWINGS

In the drawings:

FIG. 2 is a vertical sectional view of the vise of FIG. 1;

FIG. 3 is an enlarged sectional view taken along line 3—3 of FIG. 2; and

FIG. 4 is a sectional view taken along line 4—4 of FIG. 2.

DETAILED DESCRIPTION OF A PREFERRED EMBODIMENT

General Assembly

Figure 1:
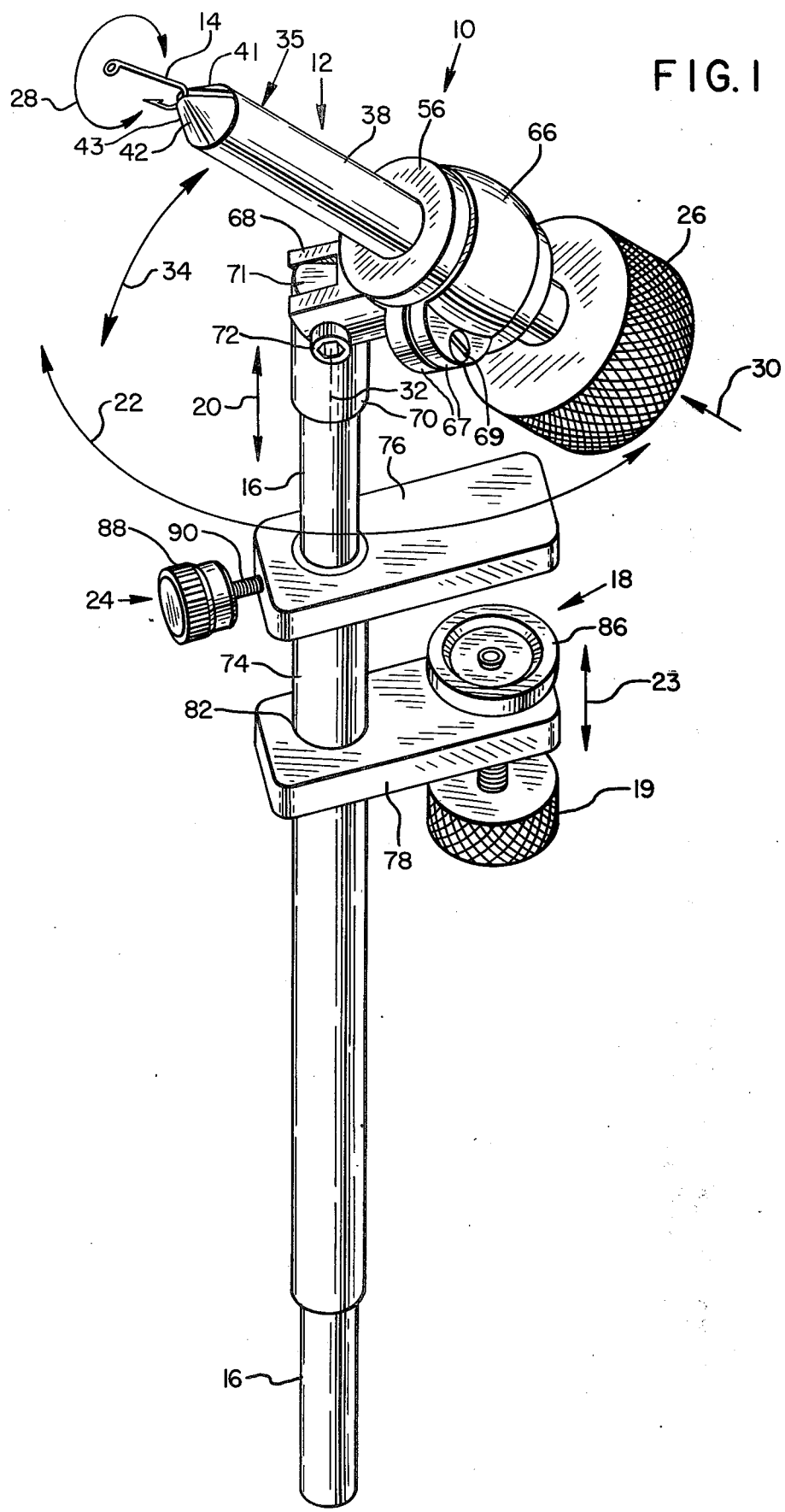
FIG. 1 is a perspective view of a fly-tying vise of the present invention.

Referring to FIG. 1, a fly-tying vise 10 includes a vise portion 12 for gripping a fly-tying hook 14. Vise portion 12 is supported at the upper end of a support portion comprising a vertical support post 16. Support post 16 carries a table clamp portion 18 below the vise portion to clamp the vise to a free edge of a tabletop.

There are several adjustments of the vise which promote efficient fly-tying. First, the vertical spacing between a pair of clamping arms 76, 78 of the clamping portion 18 can be adjusted as indicated by arrows 23 to accommodate various tabletop thicknesses. Second, the height of vise portion 12 above a tabletop can be adjusted by releasing a thumb screw 24 to enable support post 16 to slide vertically as indicated by arrows 20 in a support sleeve 74 which can remain clamped to a tabletop during this adjustment. Third, release of thumb screw 24 also enables rotation of support post 16 about its vertical axis to adjust the horizontal orientation of vise portion 12.

Fourth, vise portion 12 can be swiveled in a vertical plane in the arc described by arrows 34 about the horizontal axis 32 of a threaded fastener 72 joining the vise portion to support post 16.

Fifth, the pair of hook-clamping jaws 41, 43 of the vise portion are opened and closed by rotating a large thumb screw 26 at the rear end of the vise portion.

Sixth, the clamping jaws 41, 43 can be rotated through 360° about the axis of the elongated jaw assembly as indicated by arrows 28 by pushing inwardly on the rear end of thumb screw 26 in the direction of arrow 30 while simultaneously rotating the thumb screw. This simultaneous pushing-rotating action rotates the jaw assembly and thus a hook 14 within jaws 41, 43, without changing the clamping adjustment of the jaws. The jaw assembly can also be selectively locked after only 180° of rotation to hold the hook in either an upright or upside down position.

Vise Portion

Referring especially to FIGS. 2, 3 and 4, vise portion 12 includes an elongated jaw assembly 35 including a jaw shaft portion 36 slidably received within a jaw sleeve 38. Shaft 36 has a slot 40 extending axially inwardly from the tapered tip of an enlarged head portion 42 to define a pair of jaws 41, 43 and jaw opening to hold the hook 14. Head 42 extends outwardly of the forward end of sleeve 38 which has a tapered camming surface 44 in abutment with a complementary tapered shoulder 46 at the intersection of head 42 and shaft 36. The rear end portion of shaft 36 has a threaded shaft extension 48 extending outwardly of the rear end of sleeve 38. A thumb screw 26 is threaded onto shaft extension 48 and into abutment with the rear end of sleeve 38. Therefore, rotation of thumb screw 26 in opposite directions causes it to act as a nut member to slide shaft 36 in opposite directions within and relative to sleeve 38. This sliding action causes slot 40 to open and close under the influence of the changing camming force between tapered shoulder 46 and sleeve camming surface 44.

A pin connector 52 extends transversely through a longitudinally extending slot 54 of shaft 36 and through jaw sleeve 38 to interconnect the sleeve and shaft. The pin ends extend outwardly of the sleeve and into the interior of a surrounding housing means 56. Thus shaft 36 can slide axially within sleeve 38 within the limits of the length of slot 54 and as permitted by head 42, but cannot rotate within such sleeve.

Housing means 56 surrounds a portion of sleeve 38 containing the slot 54 and adjacent portions of shaft 36. Housing 56 is a two-piece cylindrical member with its two mating halves threaded together at 57. It has an interior space 58 housing a spring-biased detent means including a coil spring 60 bearing against pin ends 53 and seat means comprising 180 degree opposed pin end-receiving grooves 64 (see FIG. 3) in the rear inner end wall 62 of housing 56. Normally coil spring 60 urges pin ends 53 into detent grooves 64 to prevent rotation of sleeve 38 and the pin-connected shaft 36 when thumb screw 26 is simply rotated to open and close the jaws 41, 43. However, by pressing thumb screw 26 forwardly, sleeve 38 and its pin-connected shaft 36 slide forwardly relative to housing 56 against the pressure of spring 60, causing pin ends 53 to clear their detent grooves 64. Thereafter, if such forward axial pressure is maintained while rotating the thumb screw, the entire jaw assembly, including sleeve 38 and shaft 36 will rotate, and the hook 14 within jaws 41, 43 will rotate also. Importantly, such jaw rotation will occur without changing the clamping adjustment of the jaws because there will be no relative sliding movement between the sleeve and shaft.

Housing 56 is surrounded and securely clamped by a one-piece split mounting collar 66. Clamping adjustment of the collar is provided by collar flanges 67 adjustably joined by screw 69. The mounting collar has a bifurcated lower extension 68 which is pivotally connected to an upper ear extension 71 of a support cap 70 by a cap screw 72. Cap 70 fits over the top of support post 16 to mount the entire vise portion 12 to the support post while enabling tilting adjustment of the jaw assembly in a vertical plane about axis 32 of cap screw 72.

Clamp Portion

Referring to FIGS. 1 and 2, table clamp portion 18 includes a support sleeve 74 slidably mounted on support post 16 and the pair of clamping arms 76, 78 carried by such sleeve. The pair of generally parallel clamping arms 76, 78 extend transversely from support sleeve 74 for gripping opposed surfaces of an overhanging edge of a tabletop 80. Upper clamping arm 76 is fixed to the upper end of the support sleeve. However, lower clamping arm 78 is slidable along the support sleeve toward and away from the upper arm 76. For this purpose, lower arm 78 has an aperture 82 which loosely receives sleeve 74. Spaced from such aperture 82, near the outer end of arm 78, a take-up means is provided. Such means includes a thumb screw 19 threaded upwardly through arm 78 generally parallel to support sleeve 74 and protrusion means comprising a bearing disc 86 carried by the upper end of the thumb screw to bear against an undersurface of a tabletop.

From FIG. 2 it will be apparent that the vise can be quickly clamped to a tabletop by bringing upper arm 76 against the upper surface of the tabletop and then sliding lower arm 78 upwardly until bearing disc 86 engages the lower surface of the tabletop. Thereafter, by screwing bearing disc 86 into firm clamping engagement with such undersurface, a bind is created between sleeve 74 and the aperture walls of arm 78 to hold such arm in position. In other words, the lower arm applies a torque or bending moment to the sleeve to create the bind.

Set screw 24 comprises a thumb wheel portion 88 and a threaded shank portion 90, threaded through an end of upper arm 76 and a wall of support sleeve 74. By threading screw 24 into engagement with support post 16, the post can be held in any vertical or rotational position of adjustment relative to sleeve 74, even while sleeve 74 remains clamped to a tabletop.

Operation

In use, vise 10 is first secured to a tabletop 80 by sliding clamp arm 78 along sleeve 74 to a position such that both clamp arms 76 and 78 abut opposed surfaces of the tabletop. Thumb screw 19 is then turned to clamp the vise to the tabletop.

The height and horizontal orientation of vise portion 12 above the tabletop may then be adjustably set after loosening set screw 24 and then retightening such screw. Also, the vertical tilt of the jaw assembly 35 may be set after loosening cap screw 72 and then retightening it. Screw 72 may also be set at a tension permitting tilting movement of the vise portion without loosening the screw.

The jaw slot 54 is then opened to accommodate hook 14 by turning thumb screw 26 counterclockwise. The hook is then clamped firmly between jaws 41, 43 by turning thumb screw 26 clockwise.

To rotate hook 14 in the direction of arrows 28 without actuating the vise jaws, thumb screw 26 is pushed forwardly, in the direction of arrow 30 to disengage pin ends 53 from their detent grooves. While maintaining forward pressure, thumb screw 26 is turned to rotate the entire jaw assembly 35 and hook 14.

Having illustrated and described the principles of our invention by what is presently a preferred embodiment and application thereof, it will be apparent to those skilled in the art that the same permits of modification in arrangement, detail and application without departing from such principles. For example, our vise or modifications thereof could have numerous applications in holding small objects other than flies, such as jewelry. We claim as our invention all such embodiments and modifications coming within the true spirit and scope of the following claims.

We claim:

1. A table clamp for clamping a support post-supported fly-tying vise or other support post-supported device to a free edge of a tabletop, comprising:
   a support post,
   a support sleeve slidably receiving said support post therewithin,
   a pair of separate clamping arms carried by said sleeve and extending transversely therefrom,
   one of said arms including an opening therethrough near one end thereof for slidably receiving said sleeve such that said one arm is slidable along said sleeve toward and away from the other said arm,
   a table-engaging protrusion means projecting outwardly from a table-confronting side of one of said arms at a position therealong spaced from said support sleeve,
   and take-up means on one of said arms for forcing said protrusion means into firm engagement with a table surface, thereby creating a bind between a portion of said slidable arm defining its said opening and a portion of said support sleeve at said opening to hold said slidable arm in a preselected position and simultaneously create a compressive clamping force to cause said pair of arms to grip a tabletop and thereby clamp said support sleeve to said tabletop,
   and top means carried by said sleeve and selectively engagable with said support post fixing said support post within said support sleeve in various adjusted positions along the length of the support post.

2. A table clamp according to claim 1 wherein said protrusion means and said takeup means are carried by said slidable arm and said protrusion means is mounted at one end of said take-up means, and wherein said stop means comprises a set screw means carried by and extending through one end of one of said pair of clamping arms and through said support sleeve for engagement with a support post within said sleeve.

3. A fly-tying vise comprising:
   a table clamp portion for clamping said vise to a free edge of a tabletop,
   a vise portion for gripping a fly-tying hook,
   and an elongated vise support portion for supporting said vise portion above said clamp portion,
   said clamp portion including:
   a pair of generally parallel clamping arm means carried by said support means and extending transversely therefrom for gripping opposed surfaces of a tabletop,
   one of said clamping arm means being slidable along said support portion toward and away from the other said clamping arm means of said pair to accomodate various tabletop thicknesses,
   a table-engaging protrusion means projecting outwardly from a table-confronting side of one of said arm means at a position therealong spaced from said support portion,
   and take-up means on one of said arm means for forcing said protrusion means into firm engagement with a table surface, thereby creating a bind between said slidable arm means and said support portion to hold said slidable arm means in a preselected position and simultaneously to create a compressive clamping force to cause said pair of arm means to grip a tabletop,
   said support portion including a support post extending generally vertically when mounted and said clamp portion including a support sleeve slidably receiving said post,
   said pair of clamping arm means being carried by said sleeve, and stop means for selectively fixing said support post to said support sleeve in various adjusted positions along the length of said post for adjusting the vertical distance between said clamp portion and said vise portion,
   said stop means comprising a set screw means extending through one end of one of said pair of arm means and through said sleeve means into engagement with said support post.

4. A fly-tying vise comprising:
   a cable clamp portion for clamping said vise to a free edge of a tabletop,
   a vise portion for gripping a fly-tying hook,
   and an elongated vise support portion for supporting said vise portion above said clamp portion,
   said clamp portion including:
   a pair of generally parallel clamping arm means carried by said support means and extending transversely therefrom for gripping opposed surfaces of a tabletop,
   one of said clamping arm means being slidable along said support portion toward and away from the other said clamping arm means of said pair to accomodate various tabletop thicknesses,
   a table-engaging protrusion means projecting outwardly from a table-confronting side of one of said arm means at a position therealong spaced from said support portion,
   and take-up means on one of said arm means for forcing said protrusion means into firm engagement with a table surface, thereby creating a bind between said slidable arm means and said support portion to hold said slidable arm means in a preselected position and simultaneously to create a compressive clamping force to cause said pair of arm means to grip a tabletop,
   said vise portion comprising a jaw assembly including a pair of hook-clamping jaws at a forward end of said assembly and screw-operated means for opening and closing said jaws,
   and jaw-rotating means for rotating said pair of jaws about a longitudinal axis thereof while maintaining said pair of clamping jaws in a preset condition of adjustment, said screw-operated means including a thumb screw means at a rear end of said jaw assembly and said jaw-rotating means including means operable through a combination of torsional and axial pressure applied to said thumb screw means for rotating said pair of jaws.

5. A vise according to claim 4 including an elongated said jaw assembly, said jaw-rotating means including a housing means mounting said assembly for axial and rotational movement relative thereof, and spring-biased detent means within said housing means urging said jaw assembly into a detented position within said housing means preventing rotation of said jaw assembly such that rotation of said thumb screw means with said assembly in its detented position opens and closes said pair of jaws, said jaw assembly being movable axially relative to said housing means out of its detented position through application of axial pressure to said thumb screw means in a direction opposing the spring biasing force of said detent means, whereby rotation of said thumb screw means during application of said axial pressure rotates said jaw assembly without activating said pair of jaws.

6. A vise according to claim 4 wherein said support portion includes a support post and said clamp portion includes a sleeve slidably receiving said post, said pair of clamping arm means being carried by said sleeve, and stop means for selectively fixing said support post to said support sleeve in various adjusted positions along the length of said post for adjusting the vertical distance between said clamping portion and said vise portion.

7. A fly-tying vise comprising:
a table clamp portion for clamping said vise to a free edge of a tabletop,
a vise portion for gripping a fly-tying hook,
and an elongated vise-support portion for supporting said vise portion above said clamp portion,
said vise portion including:
an elongated clamping jaw assembly mounted at an upper end portion of said support portion,
said jaw assembly including a pair of clamping jaws and screw-operated means rotatable in opposite directions for opening and closing said pair of clamping jaws,
and jaw-rotating means for rotating said jaw assembly about a longitudinal axis thereof while maintaining said pair of clamping jaws in a preset condition of closure,
said rotating means including a housing means mounting said jaw assembly for rotational and limited axial movement relative to said housing means, and spring-biased detent means within said housing means urging said jaw assembly axially into a detented position restraining said jaw assembly against rotation relative to said housing, said detent means being operable upon the application of axial pressure to said assembly in a direction opposing the spring-biasing effect of said detent means to move said jaw assembly axially relative to said housing out of its detented position to enable rotation of said assembly.

8. A vise according to claim 7 wherein said jaw assembly comprises:
a jaw member including a shaft portion and an enlarged head portion forming a tapered shoulder at its intersection with said shaft portion, a jaw slot extending axially inwardly of said head portion and forward shaft portion to subdivide said head and forward shaft portion into said pair of jaws with jaw slot forming a jaw opening at said head portion, the rear end of said shaft portion terminating in a screw-threaded shaft extension,
a jaw sleeve surrounding said shaft portion with the forward end of said sleeve terminating at a tapered camming surface in abutment with said shoulder behind said head portion and with said threaded shaft extension projecting rearwardly beyond a rear end of said sleeve,
said screw-operated means including a thumb screw means threaded into said shaft extension and into abutment with the rear end of said sleeve so that with said assembly restrained against rotation, rotation of said thumb screw means opens and closes said jaw opening,
a shaft slot means extending through said shaft portion and axially along said shaft portion for a determinate length,
pin-connecting means extending transversely through said sleeve and shaft slot means to interconnect said sleeve and shaft portions while enabling limited axial movement therebetween, said pin-connecting means including pin ends projecting transversely outwardly of said sleeve to define a portion of said detent means,
said housing means surrounding said sleeve and pin-connecting means and mounting the same so as to enable mutual rotation and limited axial sliding movement of said sleeve and jaw member relative to said housing means,
said detent means including seat means in an inner end wall portion of said housing means for receiving said projecting pin ends and thereby preventing rotation of said sleeve and jaw member relative to said housing means,
and spring-biasing means within said housing urging said projecting pin ends into said seat means such that rotation of said thumb screw means without axial pressure opens and closes said jaw opening and such that rotation of said thumb screw means with axial pressure opposing said spring-biasing means and sufficient to unseat said pin ends rotates said jaw member and sleeve without opening and closing said jaw opening.

9. In a fly-tying vise, a clamping jaw assembly for gripping a hook comprising:
a jaw member including a jaw shaft portion and an enlarged jaw head portion at the forward end of said shaft portion and forming a tapered shoulder at its intersection with said shaft portion, a slot extending axially inwardly of the forward end of said head portion and into said shaft portion to subdivide said head portion and forward shaft portion into a pair of clamping jaws with the slot in said head portion forming a jaw opening, said shaft portion terminating at a rear end in a screw-threaded shaft extension,
a jaw sleeve surrounding said shaft portion with the forward end of said sleeve terminating at a tapered camming surface in abutment with said tapered shoulder behind said head portion and with the threaded shaft extension projecting rearwardly beyond a rear end of said sleeve,
a thumb screw-type nut member threaded onto said shaft extension and into abutment with the rear end of said sleeve so that rotation of said nut member while restraining said sleeve and jaw member against rotation opens and closes said jaw opening, a shaft slot means extending through said jaw shaft portion and axially along said shaft portion for a determinate length, pin-connecting means extending transversely through said sleeve and shaft slot means to interconnect said jaw sleeve and shaft portions while enabling limited axial movement therebetween, said connecting means including pin ends projecting transversely outwardly of said sleeve, housing means surrounding said sleeve and pin-connecting means and mounting said sleeve for rotation and limited axial sliding movement relative thereto, said housing means including a seat means in an inner end wall thereof for receiving the projecting pin ends and thereby preventing rotation of said jaw sleeve and jaw member relative to said housing means, and spring-biasing means within said housing means urging said projecting pin ends toward said seat means, such that rotation of said nut member with said pin ends seated and in the absence of axial pressure opens and closes said jaw opening, and such that rotation of said nut member with axial pressure opposing said spring-biasing means and sufficient to unseat said pin ends rotates said jaw member and sleeve together without changing the adjustment of said jaw opening.

10. A clamping jaw assembly according to claim 9 wherein said seat means includes at least two opposed pin endreceiving grooves at 180 degree spaced-apart positions in said inner end wall such that said jaw member with said pin ends unseated can be rotated through 180 degrees and then locked in position through reseating of said pin ends in said grooves to reverse the orientation of said clamping jaws.

* * * * *